Feb. 17, 1942.　　V. E. WHITMAN ET AL　　2,273,455
COMBINED HINGE AND LATCH STRUCTURE OF GENERAL APPLICATION
Filed July 12, 1940　　3 Sheets-Sheet 1
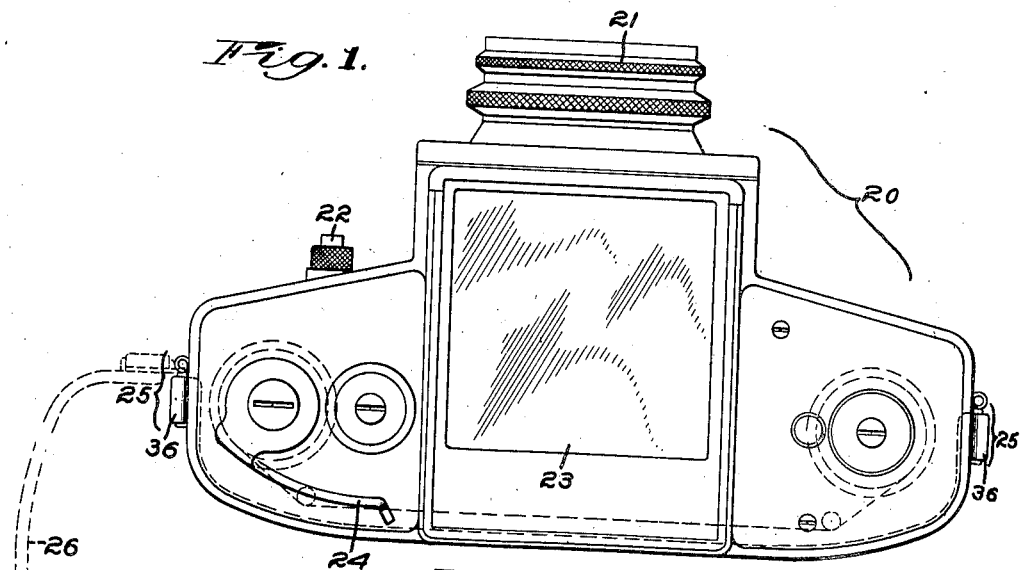
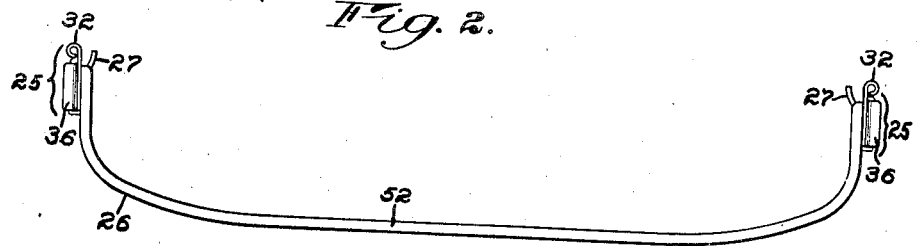
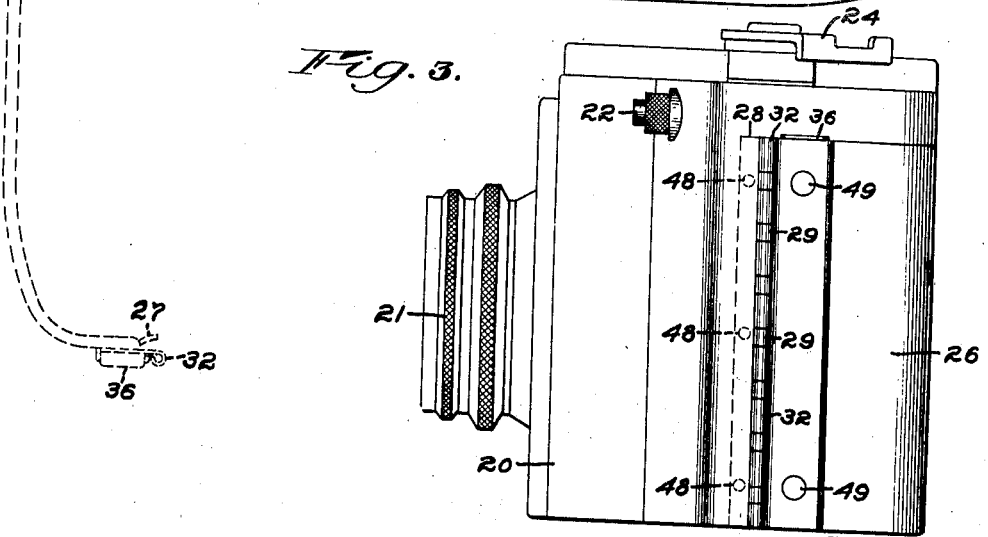
INVENTORS
Vernon E. Whitman
Louis D. Nadel
BY
his ATTORNEY.

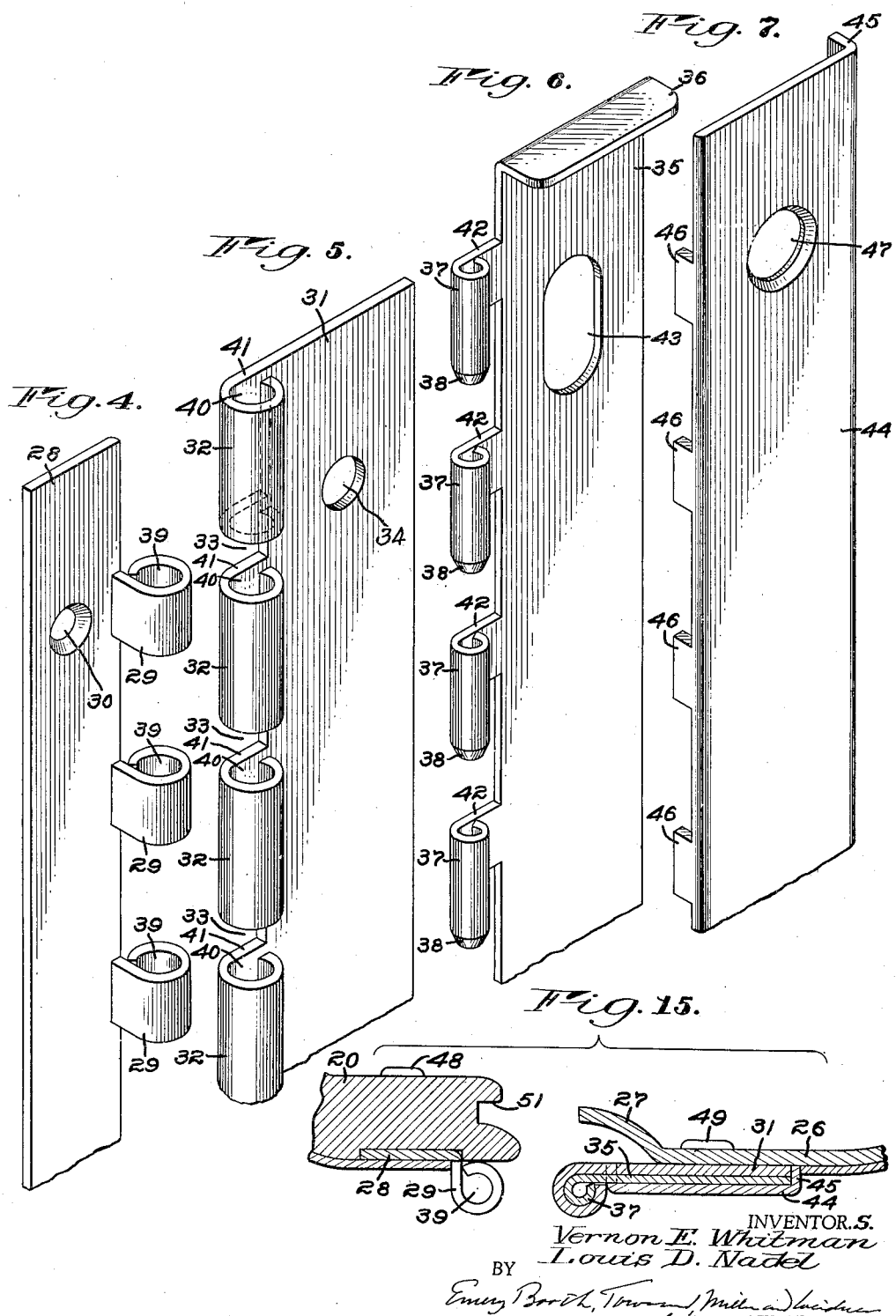

Feb. 17, 1942. V. E. WHITMAN ET AL 2,273,455
COMBINED HINGE AND LATCH STRUCTURE OF GENERAL APPLICATION
Filed July 12, 1940 3 Sheets-Sheet 3
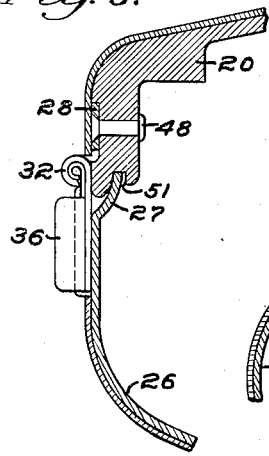
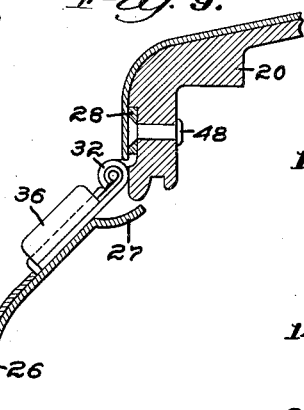
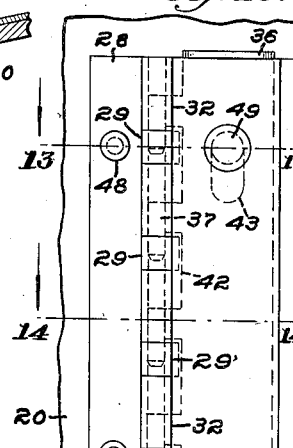
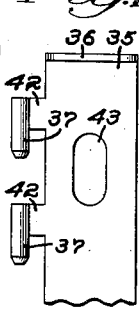
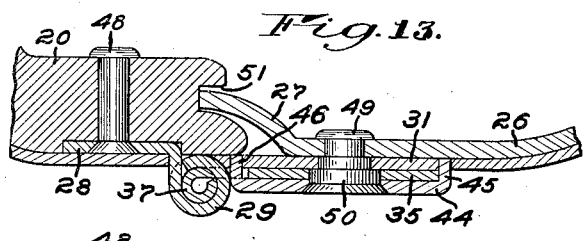
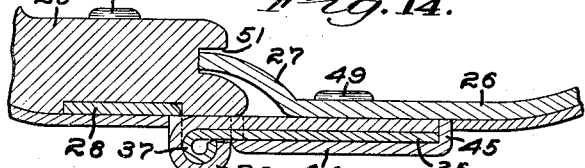
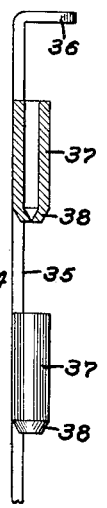
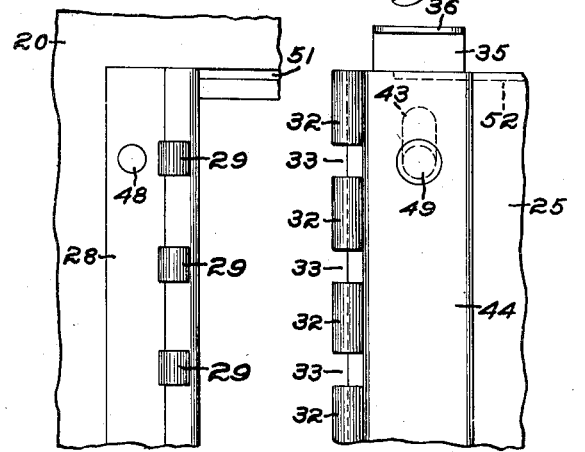
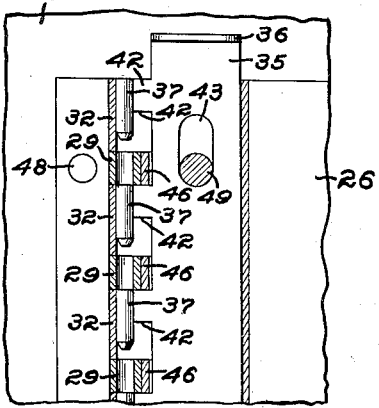
INVENTORS
Vernon E. Whitman
Louis D. Nadel
BY
his ATTORNEY.

Patented Feb. 17, 1942

2,273,455

UNITED STATES PATENT OFFICE 2,273,455

COMBINED HINGE AND LATCH STRUCTURE OF GENERAL APPLICATION

Vernon E. Whitman and Louis D. Nadel, Rochester, N. Y., assignors to The Folmer Graflex Corporation, Rochester, N. Y., a corporation of Delaware Application July 12, 1940, Serial No. 345,140

15 Claims. (Cl. 16—147)

This invention relates to combined hinge and latch structures of general application but herein shown as used for providing a hinge for a camera back or cover at either the right or left hand side of the back or cover. The invention also relates to a combined hinge and latch structure by which a camera back or cover may be hingedly secured to the body or casing of the camera either at the right hand side or at the left hand side of the opening at the back of the camera body or casing, or it may be readily and quickly entirely removed from the camera body or casing. The invention also relates to the resulting markedly novel camera structure. So far as we are aware, we are the first to provide a camera having a door, back or cover which is so connected to the camera body or casing at two opposite edges of said back or cover that the said back or cover may be swung from either of said edges as a hinge, or may be latched or looped at both such edges or may be unlocked at both of said edges, so as to be readily removable from the camera body or casing, all this being done without the removal or addition of any other piece or part, but wholly by the manipulation of the parts of the permanent structure.

In order that the principle of the invention may be readily understood, we have disclosed a single embodiment thereof in the accompanying drawings, wherein—

Fig. 1 is a top plan view of a camera having a cover equipped with our invention, the cover being shown open, in dotted lines;

Fig. 2 is a top plan view of the cover alone, showing our invention applied thereto;

Fig. 3 is an end elevation of the camera showing one of the combined hinge and latch means;

Fig. 4 is a detail in perspective of the stationary part or hinge plate of the hinge;

Fig. 5 is a similar detail of the movable hinge member or plate;

Fig. 6 is a similar detail of the hinged pin carrying member or pivot plate;

Fig. 7 is a similar detail of the hinged cover or cover plate;

Fig. 8 is a fragmentary cross section through the camera and camera cover showing the construction of the hinge and the means providing a light-tight joint between the cover and the camera casing, when the door or back is closed;

Fig. 9 is a view similar to Fig. 8, the cover having been swung to the left;

Fig. 10 is a fragmentary end elevation of the camera, showing the invention applied thereto;

Fig. 11 is a fragmentary detail in elevation of the construction shown in Fig. 6;

Fig. 12 is an end view of Fig. 11, with one of the hinge pins in section, to show more clearly the construction thereof;

Fig. 13 is a transverse section through Fig. 10 on the line 13—13 thereof;

Fig. 14 is a transverse section through Fig. 10 on the line 14—14 thereof;

Fig. 15 is a fragmentary transverse section through the camera body and cover, the latter being removed from the camera body;

Fig. 16 is a fragmentary end elevation of the camera with the cover removed, showing the stationary hinge member;

Fig. 17 is a fragmentary end elevation of the camera cover removed from the camera body, the camera latching means being in the released position; and Fig. 18 is a transverse section through the hinge member, showing the position of the various parts.

While the invention is illustrated only as applied to a camera, the cover or back whereof is through the employment of this invention hingeable at either the right or left side, it is to be understood that such showing is by way of example only and that the hinge and latch structure can be applied to numerous other articles of manufacture or structure too numerous to mention. As indicative, however, of the wide use of the invention, we mention refrigerators or ice-boxes usually supplied for homes, doors or covers on boxes or packages, and even doors of closets, cabinets, etc. For example, a refrigerator might be perfectly adaptable in size to a certain position in a kitchen or alcove of an apartment but which is not suitable because the door is mounted on a hinge at, say, the left side, whereas if it were mounted on a hinge at the right side, it would be perfectly adapted to the location preferred. Also, a closet door might be much more conveniently opened if it were hinged at the left side instead of the right, or vice versa.

In accordance with our invention, the hinging structure is duplicated at the two sides or edges in such way that by a slight sliding movement of one of the parts at each side the hinge at one side is converted into latching means and at the other side is converted from latching means into a hinge.

The invention is particularly applicable to camera structures, and without limiting ourselves in any way to such application of the invention, it is herein shown only as applied to a camera, and the resulting camera structure is also claimed herein, since we are the first so to correlate the structure of a camera casing and the structure of the cover or back thereof, that the said cover or back may swing from either the right hand or the left hand end (or from opposite edges) by slight manipulation of either part, and also permitting the latching or locking of the said cover or back at opposite edges, as well as permitting the ready removal of the said cover or back from the camera casing.

Where a camera is provided with a hinge cover, one operator prefers to have the hinge at the left hand side and another operator prefers to have the hinge at the right hand side, the latching means being, of course, opposite the hinge.

In order to solve this problem we have provided a hinge that is also a latching means, so that at the desire of the operator either hinge may be used as a hinge or as a latching means, and vice versa.

Referring more particularly to the drawings, the camera body or casing is indicated generally at 20. The camera may, of course, be of any character, using a door or cover. It is here shown as having a lens mount 21, an exposure release button 22, a hinged mirror 23 and a winding arm 24, all of which may be of any desired character. The camera herein shown is one employing a film which, viewing Fig. 1, is fed from right to left in the taking of the series of pictures. The hinges and latching means are indicated generally at 25, 25, at the two sides of the camera. It is to be understood that all the parts that will now be described are duplicated at the two sides (that is, at the two sides of the door or cover which is indicated detached at 26 in Fig. 2). Although the parts are duplicated at the two sides, it is to be understood that there are right and lefts at the two sides respectively, being, therefore, the reverse of each other.

The set of parts at each of the two sides will presently be described in detail, but it is here preliminarily stated that at each side or end of the cover, for whatever use, there are, in the selected embodiment of the invention, provided four parts herein termed (a) a stationary hinge plate, which is secured to the body of the camera, (b) a movable hinge plate, (c) a sliding pivot or dowel plate, and (d) a cover plate. The last three of these parts are all applied to the cover itself, the movable hinge plate (b) and the cover plate (d) being secured in superposed relation at the edge of the cover with the sliding pivot or dowel plate (c) positioned between them for slight longitudinal sliding movement, which movement transforms the latch into a hinge, or vice versa. These several parts are represented in perspective views 4, 5, 6, 7, and will now be described in detail.

As shown in Fig. 2, the camera cover 26 is provided at its two lateral edges with projecting ends, lips or members 27, 27 for engaging suitable grooves hereafter referred to in the camera body or casing 20, so as to prevent light-leakage.

In Fig. 4 is shown the stationary hinge plate as a preferably metal plate 28 desirably flat and of a length determined by the size of the camera. Any suitable metal may be employed, such as steel, aluminum, bronze, etc.

We will describe the structures shown in Figs. 4 to 7 as there shown, but it will be understood that at the opposite side of the cover, the same parts are provided, but of reverse construction as to the edges thereof; that is, the various edge formations, shown in Figs. 4, 5, 6, 7 as at the right or at the left, are at the other side of the cover at the opposite edge with respect thereto, as will be understood.

The said stationary hinge plate 28 is provided at one edge with a suitable number of longitudinally aligned but spaced tubular portions 29, 29, 29, only three of which are shown. The dimensions of the said tubular portions may be varied as desired or found suitable. The said plate 28 is provided with a suitable number of holes 30 for attaching the same by screws directly to the camera body or casing. Only one hole 30 is shown, and it will be understood that in Figs. 4, 5, 6, 7, the lower parts of the plates are broken away to save space upon the sheet.

In Fig. 5 is represented the so-called movable hinge plate 31. It likewise is preferably of metal and is shown as having at the left hand edge a series of vertically aligned but spaced tubular formations or portions 32 of suitable dimensions, between which are spaces 33 into which fit in use the tubular portions 29 respectively of the stationary plate 28. The said plate 31 is provided with a suitable number of holes 34 for securing the same to the cover of the camera in a manner which will be described.

The sliding pivot or dowel plate is indicated at 35 in Fig. 6. It also is preferably of suitable metal and is provided with a suitable formation to be engaged by a finger of the camera user for sliding the plate up or down, as the case may be, when transforming the hinge into a latch, or vice versa. Herein for the purpose we have represented a transversely extending bent-over upper end at 36 constituting a lip that can be readily manipulated by the user for the purpose stated. The said plate 35 is shown as provided at the left side edge thereof with a series of vertically aligned but spaced tubular or cylindrical formations or portions 37 constituting pivot pins or hinge-dowels. Desirably the lower ends of the several formations 37 are tapered as shown at 38 readily to enter the passages or holes 39 provided by the tubular portions 29 of the plate 28. The said plate 31 has similar passages or holes 40, 40 formed by the tubular portions 32, 32 and they receive the pins or hinge dowels 37 of the sliding plate 35.

It will be observed, viewing Fig. 5, and also, as more clearly indicated in the sectional view Fig. 14, that the tubular formations or portions 32, 32 are not quite closed, but that a space 41 is in each instance left to allow the lateral extensions 42, 42 of the sliding pivot-pins or dowels 37 to pass therebetween (that is, between the inturned, longitudinally extending edge of each tubular formation or portion 32 and the body of the plate 31). The sliding pivot or dowel plate 35 is provided with one or more longitudinally elongated openings 43 to allow for a longitudinal movement of the plate 35, for the purpose of engaging or positioning the pins or dowels 37, 37 in the passages or holes 39 of the stationary hinge plate 28.

In Fig. 7 is shown the cover plate at 44. This is desirably made up as a metal channel structure having a substantially right-angularly positioned, longitudinal lip 45 at the right hand edge and a series of spaced right-angularly extending short lips 46, 46 at the opposite or left hand edge. The said lips or formations 46 serve to limit the movement of the sliding pivot or dowel plate 35 by contact with the lateral extensions 42, 42 of the sliding pivot or dowel plate 35. The said cover plate 44 also has holes 47, only one of which is shown, for attaching the cover plate to the camera cover 26.

The stationary hinge plate 28 is preferably riveted to the camera body or casing 20 by means of a rivet or rivets 48, best shown in Figs. 8, 9, 10, 13 and 14.

The manner of attaching the respective parts in position is best indicated in Fig. 13. The so-called movable hinge plate 31 is secured directly to the outer face of the camera cover 26 by means of a suitable number of shoulder rivets 49 or other suitable means. Such shoulder rivets 49 also hold the cover plate 44 in position on the camera cover 46, and a shoulder 50 on each shoulder rivet 49 provides sufficient space between the plate 31 and the cover plate 44 to permit the slidable pivot or dowel plate 35 to be moved in a lengthwise direction when desired by the operator.

The camera body or casing 20 is provided with a groove 51 extending entirely around the back of cover opening of the camera for the purpose of providing a light-seal when the cover 26 is closed. The said groove 51 is most clearly shown in Figs. 8, 9, 13, 14 and 16.

The cover 26 itself is provided at each lateral edge with an angularly extending lip 27, each such lip engaging one of the vertical or upright portions of the encircling groove 51 of the camera body or casing. The cover 26 is also provided with a turned over or otherwise suitably formed top edge 52 that is most clearly shown in Fig. 2, being also indicated in dotted lines in Fig. 17. When the cover 26 is closed, the groove 51 is engaged at the respective parts thereof by the end lips or members 27 and therebetween at the upper edge of the cover by the turned-over edge 52. This provides a light-tight seal extending almost entirely about the edges of the camera cover 26. This construction is well indicated in Figs. 8 and 9, which represent the cover 26 in closed and open positions respectively. When the cover is closed, as in Fig. 8, the lip 27 is received in the corresponding part of the groove 51, but when the cover 26 is open, as shown in Fig. 9, the lip or end 27 is disengaged from the groove 51.

In Figs. 8 and 9, the left hand hinge (viewing Fig. 1) is used as a hinge and the right hand hinge (not shown in detail but indicated in Figs. 1 and 2 generally) is in such case used as a latch, thus allowing the camera cover 26 to swing to the left or clockwise viewing Fig. 1, and as illustrated in dotted lines therein. It will be apparent that were the right hand side hinge (that is, were the hinge which is shown in Fig. 8 used as a latch instead) and were the end lip 36 of the slidable pivot or dowel plate 35 moved upward, the several pins or dowels 37, 37 would thus become disengaged from the tubular or cylindrical portion 29 of the hinge member 28, thus disengaging the parts of the left hand hinge, and the camera cover would then be swung on the right hand hinge, the slidable pivot or dowel plate 35 at such right hand side having been slid downward so as to engage its own dowels or pins 37, 37 with the corresponding tubular portions 29 of the right hand stationary hinge plate 28.

It may also be desirable to remove at times the cover 26 entirely from the camera. This can readily be done by sliding upward, viewing Fig. 6, both slidable pivot or dowel plates 35, 35. This act would disengage both sets of dowels or pins 37 from their respective hinge members, thus allowing the camera cover 26 to be entirely removed from the camera. Such capacity for entire removal of the camera cover is very valuable and desirable in camera construction and is a very important feature of our novel camera structure, because it will permit the application of other backs or covers to the camera, as, for example, a special back to carry a plate holder. Or it might be desirable to have some other accessory attached or temporarily applied to the back of the camera, and this could readily be done by removing the cover 26 from the camera and fitting the auxiliary device to those parts of each hinge 25 that are normally carried by the cover 26.

In Fig. 18, the slidable pivot or dowel plate 35 is shown as having been raised, carrying with it the dowel formations or portions 37, 37, which were engaged with the cylindrical members 29, shown in Fig. 16, thus allowing the camera back to be swung on the opposite end or removed entirely from the camera, provided that the slidable pivot or dowel plate 35 on the opposite side of the camera is also raised into the position shown for the left hand plate 35 in Figs. 17 and 18.

Fig. 18, being a vertical section through the left hand plate, shows the slidable pivot or dowel plate 35 in the same position as in Fig. 17, wherein the dowel or pin formations or portions 37, 37 have been moved upward into the cylindrical structures 32, 32, sufficiently far to be disengaged from the cylindrical portions 29 of the stationary hinge plate 28, thus allowing this hinge to be separated.

The dowels or pins 37 could be attached to the pivot or dowel plate 35 and its extensions 42, 42 in a number of different ways; for example, each dowel or pin 37 could be made as a solid rod and welded or otherwise attached to the several extensions 42. The method of manufacture indicated by the drawings is, however, a very economical one and is preferred. Each of the said portions or formations 29, 32, 37 is preferably integral with the plate whereon it appears and is rolled or bent over on itself as indicated.

We have herein disclosed a structure which, while primarily intended for a convertible hinge-latch of general application will find many other uses than the specific case illustrated. As hereinbefore pointed out, we have provided a novel camera structure having peculiar and important advantages, so that our invention resides not only in the novel details of the convertible hinge-latch, but in the herein described novel camera structure.

It will be understood that when either edge construction is used as latching means, the described parts actually constitute means that will hold the cover in closed position at such edge inasmuch as the several portions or formations 29 at the latching end will then be received between the several portions or formations 32 and this will constitute a latch structure thereat.

Our invention is also particularly applicable to refrigerators or ice-boxes used in houses. Manufacturers and distributors of such articles are given much trouble because one customer may prefer to have the door swing in one direction and another customer prefer to have it swing in the opposite direction. This all depends upon the place where the customer desires to put the refrigerator or ice-box. This situation is fully met by our invention.

It is an important feature of our invention that while the structure is extremely strong, it is very inexpensive to manufacture. The structure is such that it adapts itself to considerable modification, as to the actual shape of the various parts that make up the structure. Such modifications are within the broad scope of our invention.

The so-called cover plate 44 may in some cases be entirely omitted or substantially modified in shape or structure, but it is desirable to have a cover member of some form to overlie more or less and protect the slidable plate 35. Such changes will be within the scope of our invention.

Having thus described one illustrative embodiment of the invention, it is to be understood that although specific terms are employed, they are used in a generic and descriptive sense and not for purposes of limitation, the scope of the invention being set forth in the following claims.

We claim:

1. A combined, quickly convertible hinge and latch device for body structures having doors or like closures, comprising, in combination, a first hinge plate having at an edge thereof spaced, dowel-receiving, tubular formations, the encircling end edges whereof are in parallelism; a second hinge plate having at an edge thereof dowel-receiving, tubular formations which alternate in position with those of said first hinge plate, so that all of said formations are brought into alignment when the said two plates are positioned for use, the end edges of the said tubular formations of said second hinge plate also being in parallelism, a pivot plate slidable to two positions, said plate having at an edge thereof pivotal dowel-pin, cylindrical formations spaced in accordance with the spacing of the formations of the second hinge plate and of such length as, in one position of said pivot plate, to be receivable as a set in all of said formations of said two hinge plates when in alignment, or so as to be positioned only in the formations of said second hinge in the other position of said pivot plate, the said tubular formations of said second hinge plate having lengthwise extending, free edges spaced substantially from the body of said second hinge plate and the cylindrical formations of said slidable pivot plate being continuations of lateral extensions of the body of the said slidable pivot plate, the said lateral extensions being in assembling the parts, insertable between said free edges of the tubular formations of said second hinge plate and the body of such second hinge plate.

2. A device in accordance with claim 1, but to which three specified plates there is added a cover plate that, when positioned, overlies flatwise two of said three specified plates, but permits the said slidable pivot plate to be slid when positioned under said cover plate.

3. A device in accordance with claim 1, but to which three specified plates there is added a cover plate having at a longitudinal edge thereof spaced lips constituting limiting stops for the sliding movement of said pivot plate.

4. A device in accordance with claim 1, but to which three specified plates there is added a cover plate that, when positioned, overlies flatwise two of said three specified plates, but permits the said slidable pivot plate to be slid when positioned under said cover plate, the said slidable pivot plate having at one end thereof a handle-formation which when the said four plates are assembled is accessible for manual grasping to slide said pivot plate.

5. A device in accordance with claim 1, but to which three specified plates there is added a cover plate that, when positioned, overlies flatwise two of said three specified plates, but permits the said slidable pivot plate to be slid when positioned under said cover plate, the said slidable pivot plate having at its upper end an outwardly extending lip that, when the said four plates are assembled, projects beyond the adjacent end of the cover plate in position to be manually engaged to slide said pivot plate.

6. A device in accordance with claim 1, in which the dowel-pin formations of the slidable pivot plate have tapered ends to facilitate their entrance into the tubular formations of the first hinge plate.

7. A combined hinge and latch device for body structures having doors and like closures comprising in combination, a pair of hinge plates adapted to be attached to the body structure at the respective sides of the door to which the said combined hinge and latch device pertains; a pair of hinge plates adapted to be respectively secured to the door at opposite sides thereof, said two companion plates at each side of the door having dowel-receiving tubular portions which, when positioned for use, are in alignment; a pair of slidable pivot plates positionable at the respective sides of the door in superposed relation to said hinge plates that are there secured to the door, and each such slidable plate having pivotal dowel pin formations to be received in the said dowel-receiving portions when aligned; and a pair of cover plates adapted to overlie said slidable plates respectively and to be secured in such overlying position to the door at the opposite sides thereof, each cover plate having one or more formations engageable with the companion sliding plate to limit the sliding movements thereof.

8. A construction according to claim 7, in which shoulder rivets are provided to secure each cover plate in position overlying the corresponding slidable pivot plate, and also to secure each hinge plate directly against the cover, the shouldered portions of said rivets providing spacing means for the cover plate.

9. A combined, quickly convertible, hinge and latch device for body structures having doors and like closures comprising in combination, a first hinge plate adapted to be attached to the said body structure at an edge of the door to which the combined convertible hinge and latch pertains, and having spaced dowel-receiving formations; a second hinge plate adapted to be secured to the door at the edge thereof adjacent such first hinge plate, said plate secured at the edge of the door having dowel-receiving formations which, when positioned for use, are in alignment with the said dowel-receiving formations of said first hinge plate; a pivot plate slidable to two positions, said plate being positionable at the said edge of the door in superposed relation to said second hinge plate, such slidable pivot plate having pivotal dowel-pin formations to be received in one position of said pivot plate only in the said dowel-receiving formations of said second hinge plate, and to be received also in said formations of the first hinge plate in the other position of said pivot plate; and a cover plate adapted to overlie said slidable pivot plate and to be secured in such overlying position to the door at the said edge thereof, whereby the door may either hinge or latch at said edge, depending upon the position of the said slidable pivot plate at the said edge of the door, the hinge plate which is adapted to be secured to the door being a series of formations consisting of rolled, lateral, edge portions, the free end of each of which formations is spaced from the body of the plate, the said pivot plate being also provided at the corresponding edge with spaced formations, parts whereof are insertable in the said spaces between the said free ends of the rolled formations and the body of the plate having said rolled formations.

10. A combination according to claim 9, but in which the said second hinge plate is provided with a series of spaced, rolled formations providing dowel-receiving parts, the free edges whereof are spaced from the body of the hinge plate, and in which combination the said slidable pivot plate is provided at the corresponding edge with a corresponding series of spaced formations having portions insertable between the free edges of said formations on the said second hinge plate and the body of said plate.

11. A combination according to claim 9, but in which the said cover plate provided to overlie the slidable pivot plate is provided with means to hold it in spaced relation therefrom to permit sliding movement of said pivot plate.

12. A combination in accordance with claim 9, but in which the cover plate is provided with a series of spaced lateral formations constituting limiting stops for the sliding movement of said pivot plate.

13. A combination according to claim 9, but in which shouldered rivets are provided to hold the cover plate in sufficiently spaced relation with respect to the slidable plate to permit the latter to be slid by the operator.

14. A combination according to claim 9, but in which the cover plate is provided with one or more lateral formations constituting limiting stops for the sliding movement of said pivot plate.

15. A combined, quickly convertible hinge and latch device for body structures having doors or like closures, comprising in combination, a first hinge plate having at an edge thereof spaced dowel-receiving tubular formations, the encircling end edges whereof are in parallelism; a second hinge plate having at an edge thereof dowel-receiving, tubular formations which alternate in position with those of said first hinge plate, so that all of said formations are brought into alignment when the said two plates are positioned for use, the end edges of the said tubular formations of said second hinge plate also being in parallelism, a slidable pivot plate having at an edge thereof pivotal dowel-pin, cylindrical formations spaced in accordance with the spacing of the formations of the second hinge plate and of such length as in one position thereof to be receivable as a set in all of said formations of said two hinge plates when in alignment, or in another position to be received only in the formations of said second hinge plate, the tubular formations of the said second hinge plate having throughout the length of said formations lengthwise extending, free edges spaced throughout substantially from the body portion of said second hinge plate to permit the reception of the entire edge portions of said slidable pivot plate from which the said pivotal dowel-pin cylindrical formations extend in assembling the parts.

VERNON E. WHITMAN.
LOUIS D. NADEL.